(12) United States Patent
Nakamura et al.

(10) Patent No.: US 9,643,519 B2
(45) Date of Patent: May 9, 2017

(54) VEHICULAR SEAT DEVICE

(71) Applicant: HONDA MOTOR CO., LTD., Tokyo (JP)

(72) Inventors: Mitsumasa Nakamura, Wako (JP); Maki Yamaguchi, Wako (JP); Koki Sato, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/780,066

(22) PCT Filed: Apr. 11, 2014

(86) PCT No.: PCT/JP2014/060472
§ 371 (c)(1),
(2) Date: Sep. 25, 2015

(87) PCT Pub. No.: WO2014/168233
PCT Pub. Date: Oct. 16, 2014

(65) Prior Publication Data
US 2016/0046210 A1    Feb. 18, 2016

(30) Foreign Application Priority Data

Apr. 12, 2013 (JP) ................................. 2013-083824

(51) Int. Cl.
*B60N 2/36*    (2006.01)
*B60N 2/20*    (2006.01)
(Continued)

(52) U.S. Cl.
CPC .............. *B60N 2/206* (2013.01); *B60N 2/06* (2013.01); *B60N 2/065* (2013.01); *B60N 2/22* (2013.01);
(Continued)

(58) Field of Classification Search
CPC .......... B60N 2/06; B60N 2/065; B60N 2/206; B60N 2/22; B60N 2/3013; B60N 2/3047; B60N 2/3075
(Continued)

(56) References Cited

U.S. PATENT DOCUMENTS 6,099,072 A * 8/2000 Sturt .................... B60N 2/3011
297/15 X
6,123,380 A * 9/2000 Sturt .................... B60N 2/3011
297/15 X
(Continued)

FOREIGN PATENT DOCUMENTS

CN    1642774    7/2005
CN    102555859    7/2012
(Continued)

OTHER PUBLICATIONS

International Search Report, Date of Mailing: May 13, 2014 (May 13, 2014).
(Continued)

*Primary Examiner* — Rodney B White
(74) *Attorney, Agent, or Firm* — Rankin, Hill & Clark LLP

(57) ABSTRACT

In a vehicular seat device (20), a right seat (24) is movably supported via a right slide rail (21). The right seat is provided with a seat back (61) mounted to a movable base (31) of the right slide rail, a seat cushion (69) rotatably mounted to the seat back, and a connecting link (81) rotatably supporting a front portion (69a) of the seat cushion on the movable base. The connecting link includes a leg link portion (84) detachably supported on the movable base. The right seat when folded in a storage mode is movable to a storage position (13) of a lower floor (12).

3 Claims, 11 Drawing Sheets

(51) Int. Cl.
  *B60N 2/06* (2006.01)
  *B60N 2/30* (2006.01)
  *B60N 2/22* (2006.01)
(52) U.S. Cl.
  CPC ......... *B60N 2/3013* (2013.01); *B60N 2/3047* (2013.01); *B60N 2/3075* (2013.01)
(58) Field of Classification Search
  USPC .......................................... 297/15, 331, 334
  See application file for complete search history.

(56) References Cited

U.S. PATENT DOCUMENTS

| | | | | |
|---|---|---|---|---|
| 7,066,539 | B2* | 6/2006 | Hatta | B60N 2/01583 |
| | | | | 297/334 X |
| 7,077,463 | B2* | 7/2006 | Sun | B60N 2/3047 |
| | | | | 297/334 X |
| 7,240,949 | B1 | 7/2007 | Moushegian et al. | |
| 7,686,389 | B2* | 3/2010 | Yamada | B60N 2/3013 |
| | | | | 297/15 |
| 7,878,592 | B2* | 2/2011 | Yamada | B60N 2/22 |
| | | | | 297/331 |
| 8,360,497 | B2* | 1/2013 | Kokubo | B60N 2/0232 |
| | | | | 297/15 X |
| 8,474,910 | B2* | 7/2013 | Kammerer | B60N 2/12 |
| | | | | 297/334 X |
| 2003/0071492 | A1* | 4/2003 | Watanabe | B60N 2/206 |
| | | | | 297/15 |
| 2004/0056521 | A1* | 3/2004 | Kayumi | B60N 2/01 |
| | | | | 297/334 |
| 2004/0212237 | A1* | 10/2004 | Epaud | B60N 2/06 |
| | | | | 297/331 |
| 2006/0061174 | A1* | 3/2006 | Saberan | B60N 2/12 |
| | | | | 297/331 |
| 2006/0071527 | A1 | 4/2006 | Park | |
| 2006/0267390 | A1 | 11/2006 | Epaud | |
| 2007/0040418 | A1* | 2/2007 | Ohkuma | B60K 1/04 |
| | | | | 297/15 |
| 2008/0284214 | A1* | 11/2008 | Neale | B60N 2/06 |
| | | | | 297/15 |
| 2010/0084903 | A1* | 4/2010 | Kammerer | B60N 2/12 |
| | | | | 297/331 X |

FOREIGN PATENT DOCUMENTS

| | | |
|---|---|---|
| DE | 102006023176 | 11/2006 |
| EP | 1568536 A2 | 8/2005 |
| EP | 1719659 A2 | 11/2006 |
| JP | H03-93233 | 9/1991 |
| JP | 2004-066959 A | 3/2004 |
| JP | 2004-249109 | 9/2004 |
| JP | 2005-280501 | 10/2005 |
| JP | 2005-297834 | 10/2005 |
| JP | 2006-321483 | 11/2006 |
| WO | 2008/015527 A1 | 2/2008 |

OTHER PUBLICATIONS

Japanese Notice of Allowance with English Translation dated Jun. 14, 2016, 6 pages.
Chinese Office Action dated Aug. 2, 2016, with English Translation, 11 pages.
European Search Report dated Jan. 25, 2017, 6 pages.

* cited by examiner

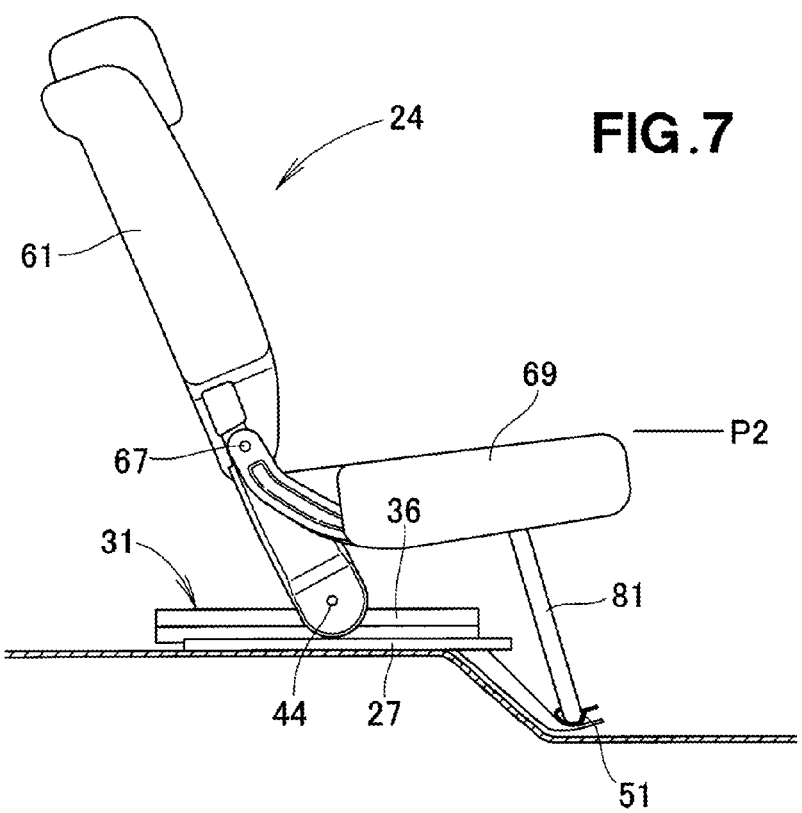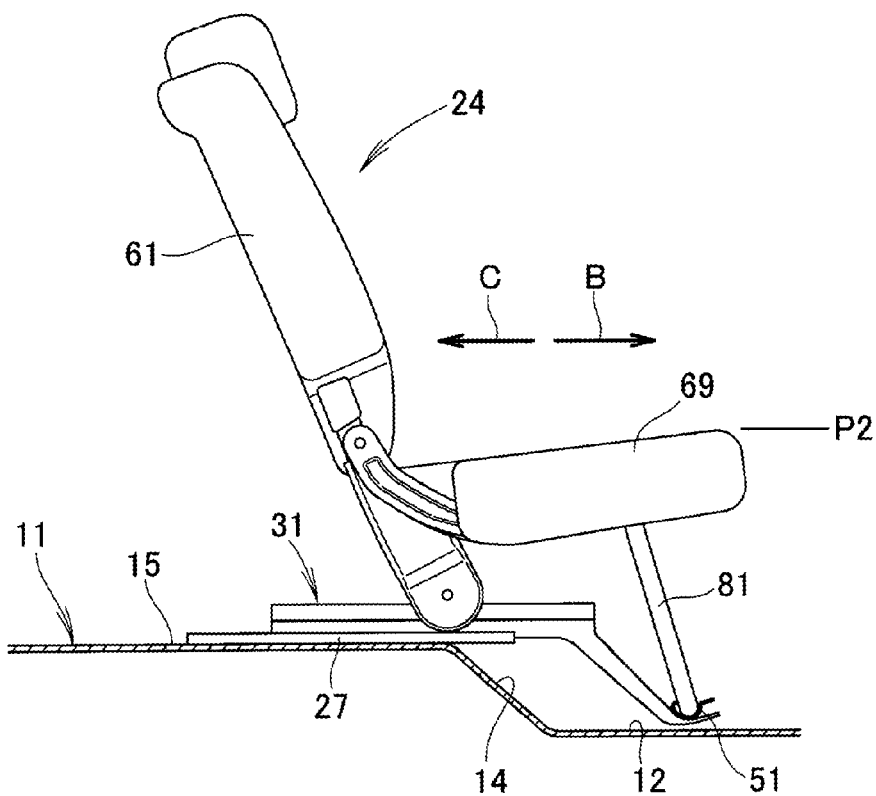
FIG.7

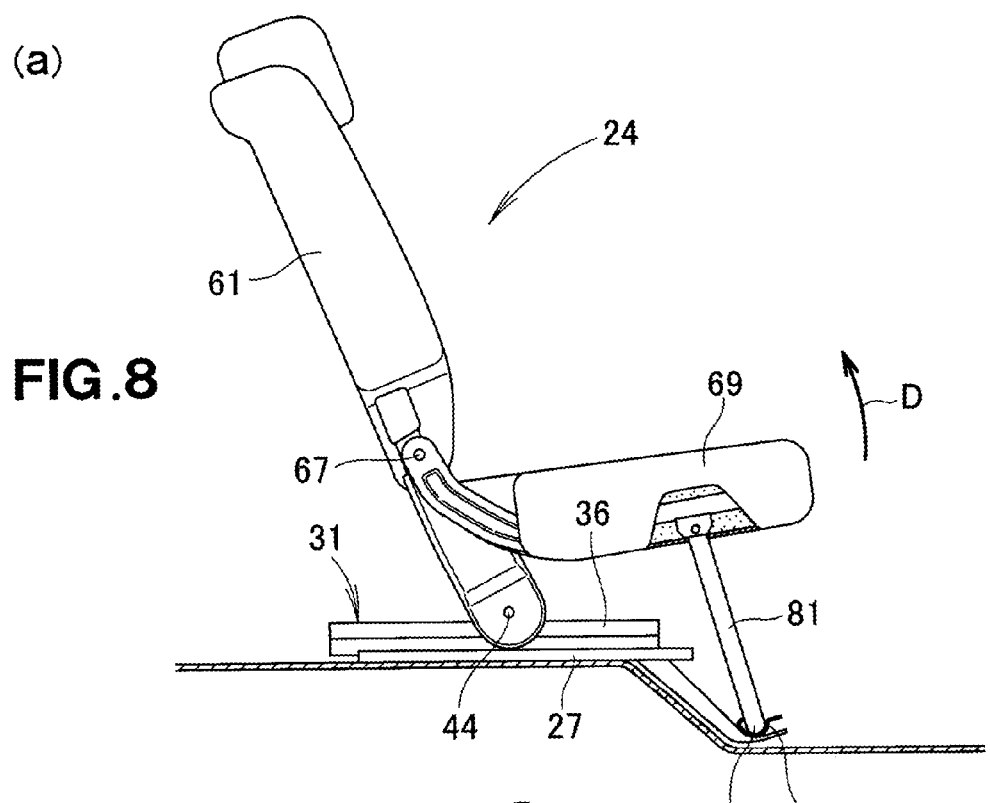
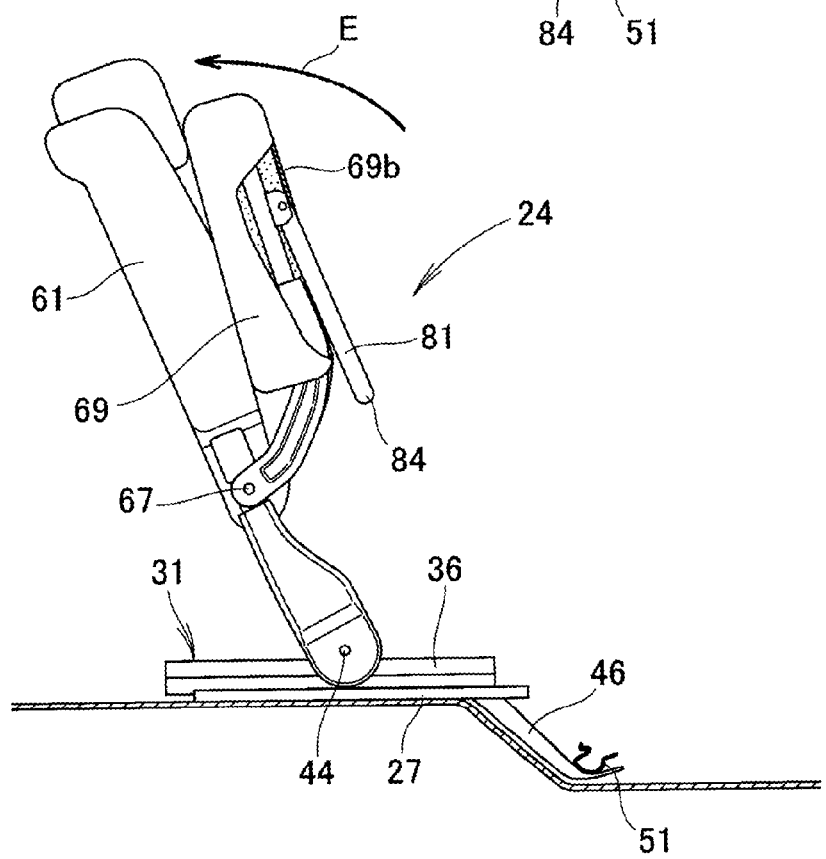
FIG.8

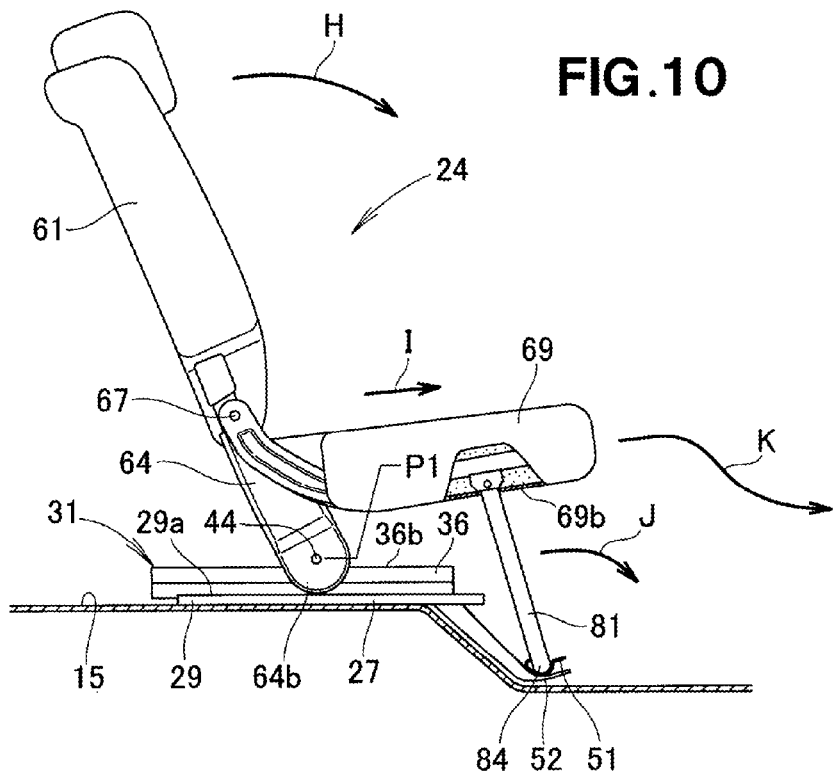
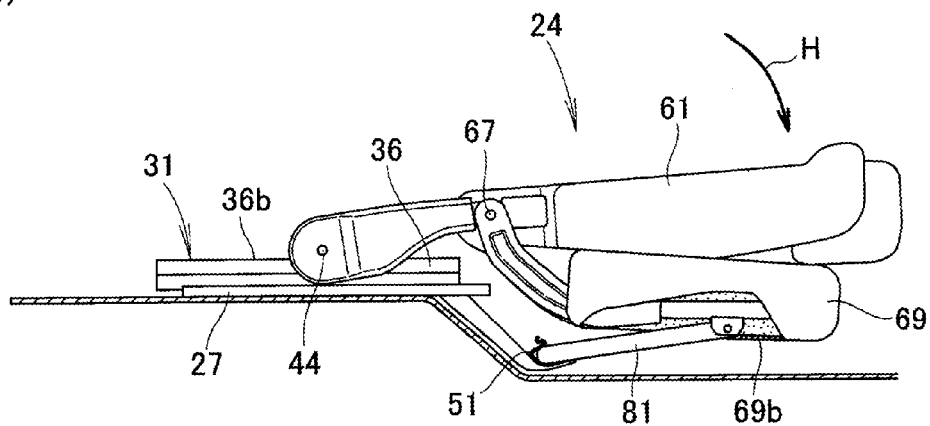
FIG.10

VEHICULAR SEAT DEVICE

TECHNICAL FIELD

The present invention relates to a vehicular seat device having a seat and a slide rail, the slide rail including a stationary rail provided on a vehicle body floor and a movable base provided on the stationary rail such that the movable base is movable in a front-rear direction of the vehicle body, the seat being provided on the movable base.

BACKGROUND ART

A known vehicular seat device includes a base section provided to a flat floor via a slide rail, and a seatback pivotably provided to the base section via a lower arm. The seatback can forwardly pivot about a lower end portion of the lower arm to stow a seat in a folded position.

More specifically, upon the pivotal movement of the seatback of the vehicular seat device about the lower end portion of the lower arm, a connection link pushes a front link forwardly, such that the front link and a rear link pivot forwardly into a lying position to thereby move a seat cushion in a forward and downward direction of a vehicle body. As a result, the seat is stowed in the folded position. See patent literature 1.

As discussed above, the vehicular seat device of patent literature 1 is provided on the flat floor. For this reason, the seat cushion and the seat back are disposed above the floor as the seat is stowed in the folded position.

As a result, the folded seat inevitably has a large height from the floor.

In order that the seat of the vehicular seat device has a smaller height from the floor, a lower floor for storing the folded seat is provide lower than the floor supporting the seat (see patent literature 2).

More specifically, the lower floor is connected via a wall to the floor. A slide rail is provided on the floor and the wall. The slide rail has a vertically extending rail portion (hereinafter referred to as "vertical rail") provided on the wall.

When the seat is folded, the seat is moved by the vertical rail to the lower floor, such that the folded seat is disposed (stowed) on the lower floor. For this reason, the seat folded in the stowed position (hereinafter referred to as "stowage" mode) has its reduced height.

In patent literature 2, as discussed above, the seat is supported by (connected to) the vertical rail when the folded seat is disposed in the stowage mode on the lower floor. Thus, the folded seat on the lower floor cannot move e.g., in the forward direction of the vehicle body.

For this reason, it has been desired to achieve a more convenient seat which can move in the forward direction of the vehicle body as the seat is folded in the stowage mode.

PRIOR ART LITERATURE

Patent Literature

Patent Literature 1: JP-A-2005-280501 A
Patent Literature 2: JP-U-03-93233 A

SUMMARY OF INVENTION

Technical Problem

An object of the present invention is to provide a vehicular seat device having a seat which can move in a forward direction of a vehicle body as the seat is folded in a stowage mode.

Solution to Problem

According to one aspect of the present invention, as defined in claim 1, there is provided a vehicular seat device comprising a seat and a slide rail, the slide rail including a stationary rail and a movable base movably provided on the stationary rail, the stationary rail being secured to a high level floor of a vehicle body floor and extending in a front-rear direction of a vehicle body, the high level floor being provided rearward of and connected to a low level floor of the vehicle body floor, the seat being provided on the movable base, the seat being supported by the vehicle body floor through the slide rail such that the seat is movable in a front-rear direction of a vehicle,
wherein the seat comprises:
a seatback provided on the movable base such that the seatback is pivotable in the front-rear direction of the vehicle body;
a seat cushion having a rear portion supported by the seatback such that the seat cushion is pivotable about the rear portion of the seat cushion in the front-rear direction of the vehicle body; and
a connection link having a lower end portion detachably supported by the movable base, the seat cushion having a front portion supported by the movable base through the connection link such that the front portion of the seat cushion is movable in the front-rear direction of the vehicle body,
wherein the seatback is forwardly pivotable to overlie the seat cushion, and
wherein the seat is movable to a stowing location of the low level floor with the seatback overlying the seat cushion.

Preferably, as defined in claim 2, the seatback has a lower end disposed lower than a top surface of the slide rail.

Advantageous Effects of Invention

Regarding the invention defined in claim 1, the front portion of the seat cushion is supported by the movable base through the connection link, such that the front portion is movable in the front-rear direction of the vehicle body. Thus, the movable base can support the seat folded in a stowage mode. As a result, the seat folded in the stowage mode can be moved (slid) by the movable base in a forward direction of the vehicle body to reach the stowing location of the low level floor. This improves a convenience of the seat.

The seat cushion is provided on the seatback such that the seat cushion can pivot in the front-rear direction of the vehicle body. The lower end portion of the connection link is detachably supported by the movable base. Detachment of the lower end portion of the connection link from the movable base enables the seat cushion to tip up by pivoting back onto the seatback. With the tipped seat cushion on the seatback, the seat can be moved (slid) by the movable base in the forward direction of the vehicle body.

Regarding the invention defined in claim 2, the lower end of the seatback is disposed lower than the top surface of the slide rail. As a result, the seat can have its reduced height as the seat is folded in the stowage mode. This further improves the convenience of the seat.

BRIEF DESCRIPTION OF DRAWINGS

FIG. 7 illustrates an example in which the right seat according to the present invention slides in a seating mode in the forward direction of the vehicle body;

FIG. 8 illustrates an example in which the right seat according to the present invention is disposed in a tip-up mode;

FIG. 10 illustrates an example in which the right seat according to the present invention is disposed in a stowage mode.

DESCRIPTION OF EMBODIMENT

A certain preferred embodiment of the present invention is described below with reference to the accompanying drawings. Throughout the specification and drawings, the terms "front (Fr)", "rear (Rr)", "left (L)" and "right (R)" denote respective directions in which a driver views.

Embodiment

Figure 1:
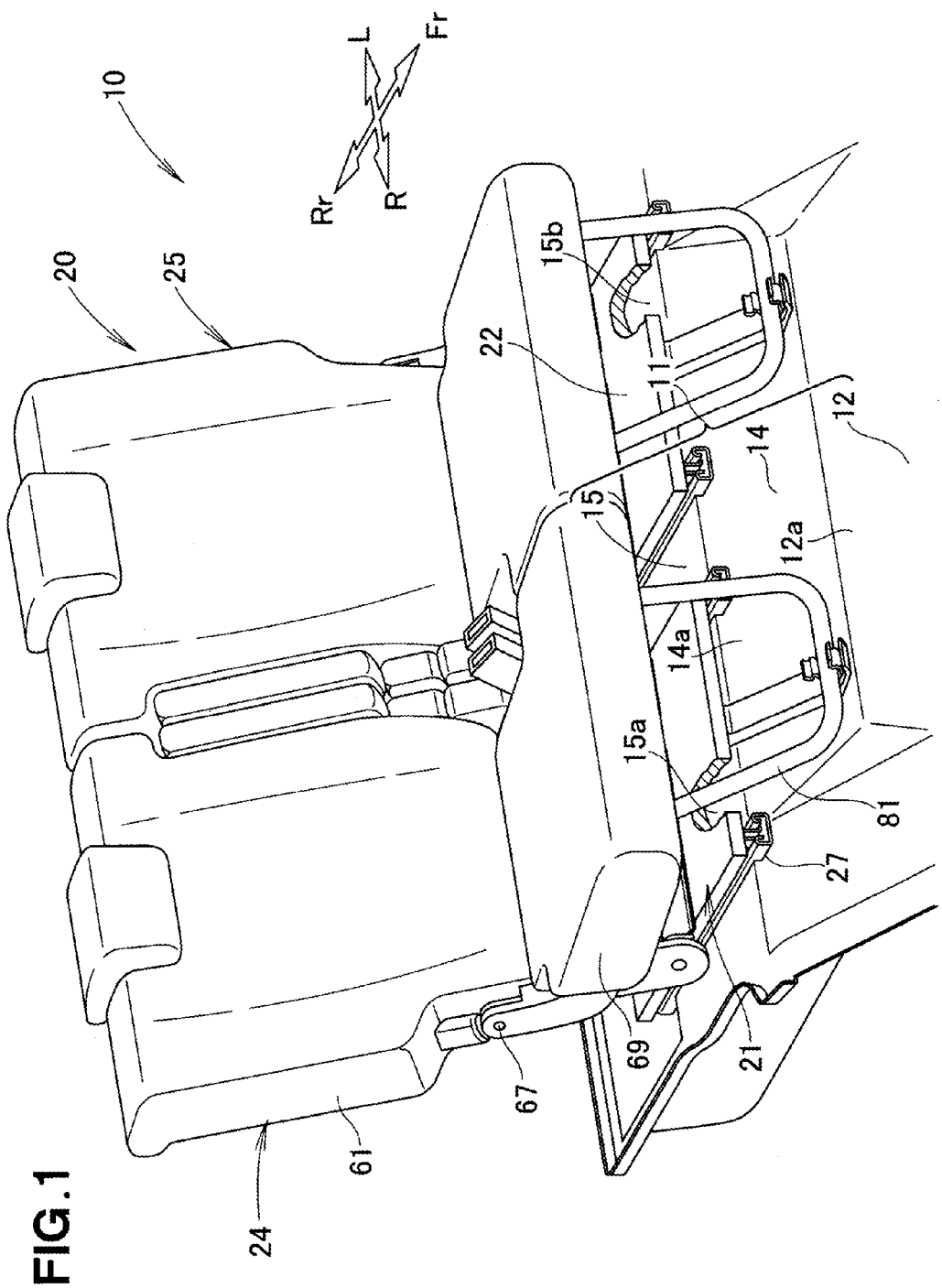
FIG. 1 is a perspective view of a vehicular seat device.
Figure 2:
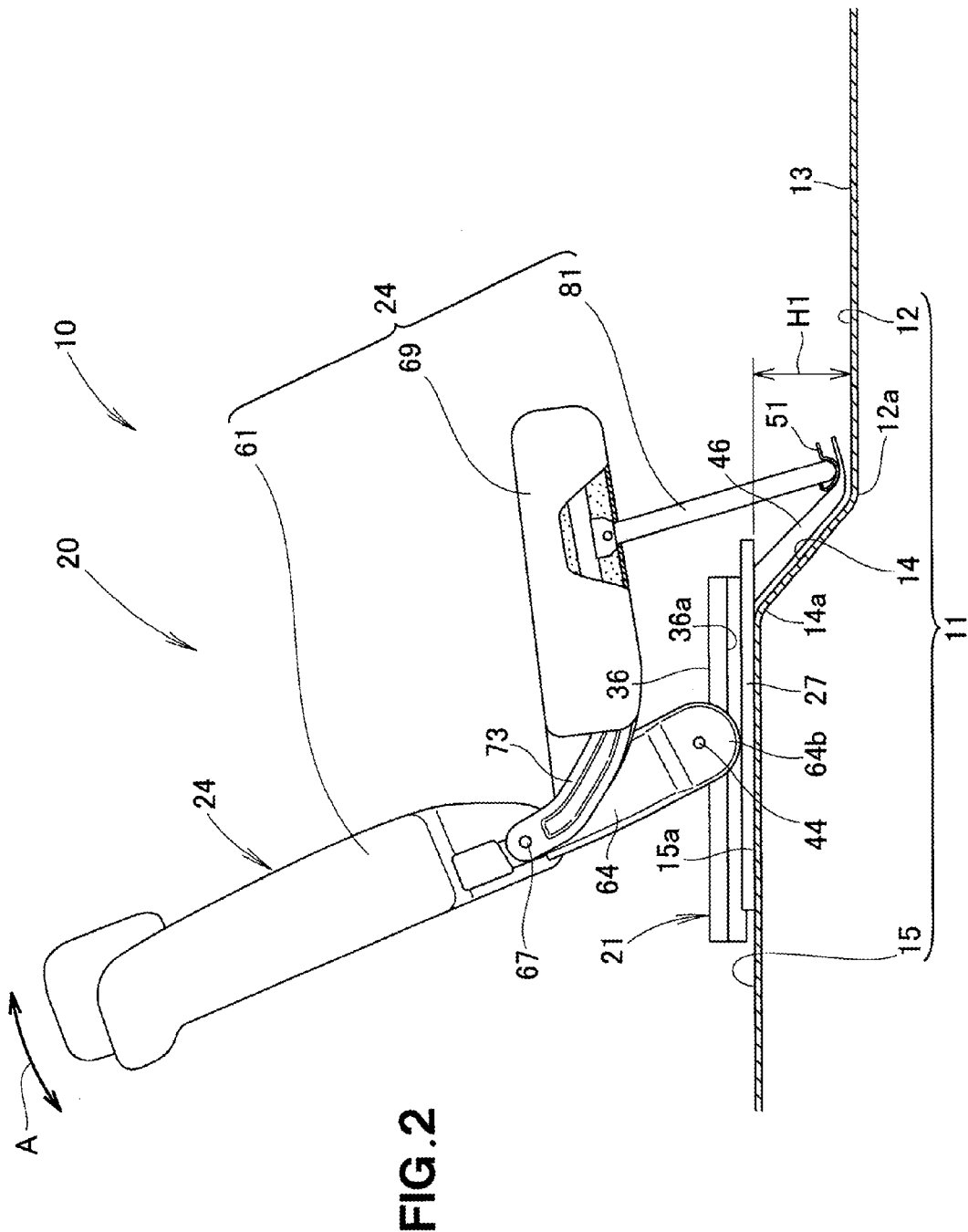
FIG. 2 is a side elevation view of the vehicular seat device of FIG. 1.

A vehicular seat device 20 in Embodiment is discussed below. As shown in FIGS. 1 and 2, a vehicle 10 includes a vehicle body floor 11 defining a floor section of the vehicle 10, and the vehicular seat device 20 provided on the vehicle body floor 11.

The vehicular seat device 20 is a rearmost row of seats provided on a rear part of the vehicle body floor 11.

The vehicle body floor 11 has a generally horizontally low level floor 12 located in front of the vehicular seat device 20, a sloping floor 14 extending obliquely upwardly from a rear end portion 12a of the low level floor 12 in a rear direction of a vehicle body, and a high level floor 15 generally horizontally extending from a rear end portion 14a of the sloping floor 14 in the rear direction of the vehicle body.

That is, the vehicle body floor 11 is a continuous floor defined by the high level floor 15 provided rearward of the low level floor 12, the sloping floor 14, and the low level floor 12 having the rear end portion 12a connected to the high level floor 15 via the sloping floor 14.

The low level floor 12 has a stowing location 13 to store the vehicular seat device 20 in a stowage mode (see FIG. 11) where a seatback 61 of the vehicular seat device 20 pivots forwardly to a lying position to fold the vehicular seat device 20.

The high level floor 15 is located a height H1 higher than the low level floor 12.

The vehicular seat device 20 includes a right slide rail 21 provided in a right half part 15a of the high level floor 15, a left slide rail 22 provided in a left half part 15b of the high level floor 15, a right, seat 24 supported by the right slide rail 21, and a left seat 25 supported by the left slide rail 22.

The right seat 24 is supported through the right slide rail 21 by the vehicle body floor 11 such that the right seat 24 is movable (hereinafter referred to as "slidable") in a front-rear direction of the vehicle.

The left seat 25 is supported through the left slide rail 22 by the vehicle body floor 11 such that the left seat 25 is slidable in the front-rear direction of the vehicle.

The right slide rail 21 and the left slide rail 22 are members disposed in a generally symmetrical relationship with each other. The right slide rail 21 is hereinafter discussed in detail and a discussion of the left slide rail 22 is omitted.

The right seat 24 and the left seat 25 are members disposed in a generally symmetrical relationship with each other. The right seat 24 is hereinafter discussed in detail and a discussion of the left seat 25 is omitted.

Figure 3:
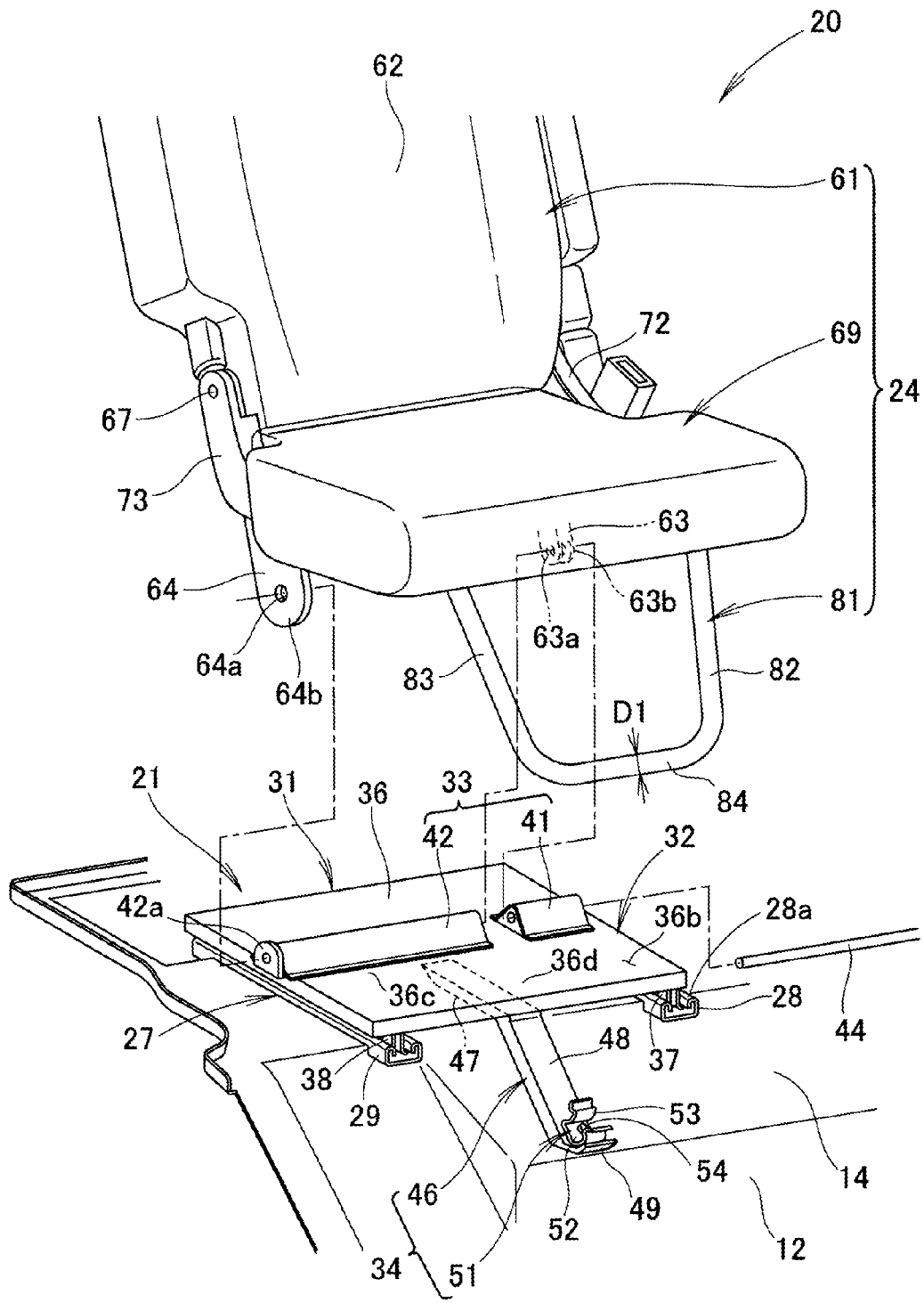
FIG. 3 is an exploded perspective view of the vehicular seat device of FIG. 1.
Figure 4:
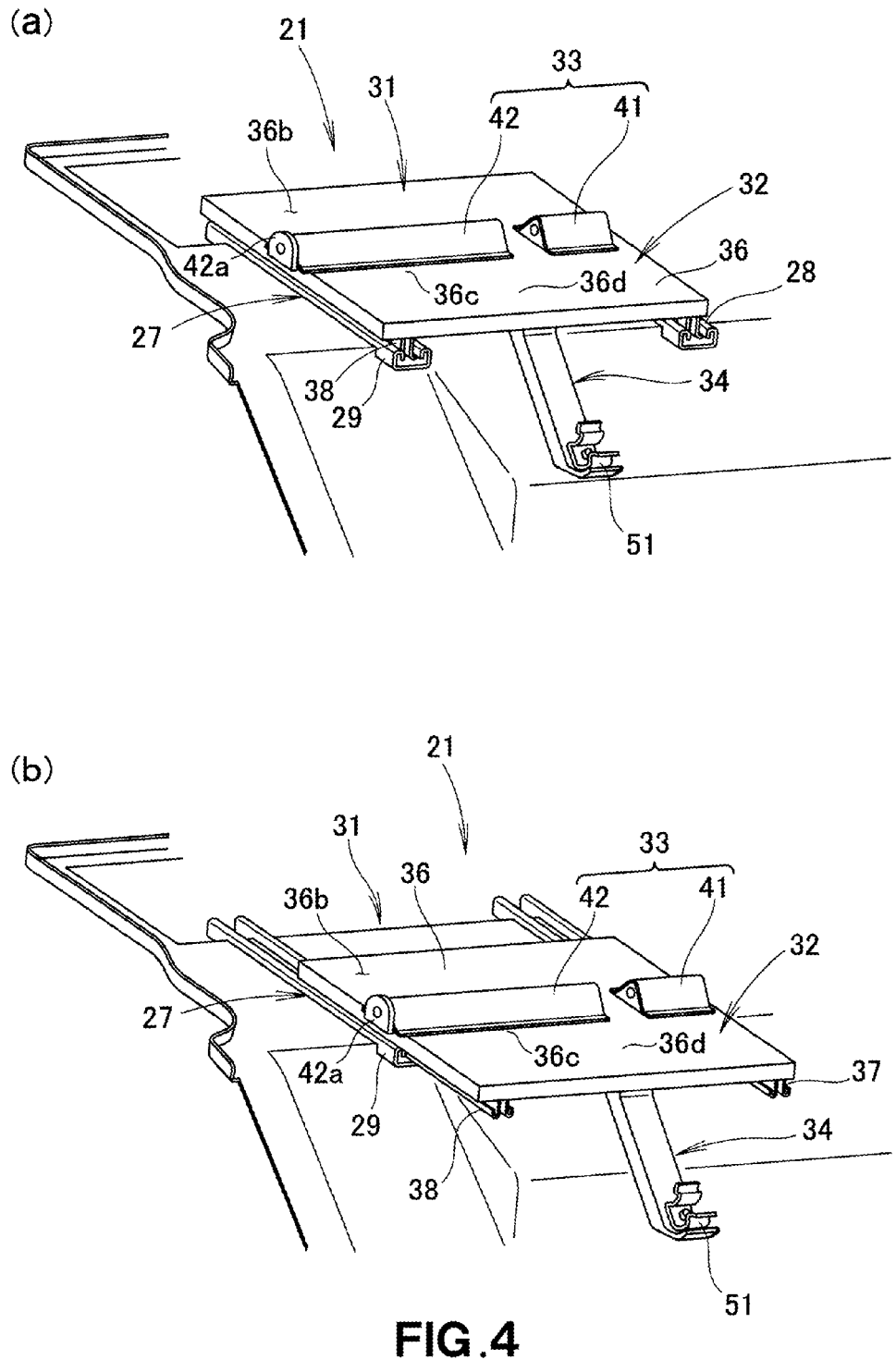
FIG. 4(a) is a perspective view of a right slide rail of FIG. 3
FIG. 4(b) is a perspective view of a movable base of FIG. 4(a), the movable base having slid in a forward direction of a vehicle body.

As shown in FIGS. 3 and 4, the right slide rail 21 includes a stationary rail 27 secured to the high level floor 15 and extending in the front-rear direction of the vehicle body, and a movable base 31 slidably provided on the stationary rail 27.

The stationary rail 27 includes an inner rail 28 provided near a center of a width of the vehicle in the right half part 15a of the high level floor 15, and an outer rail 29 provided on an outside of the width of the vehicle in the right half part 15a of the high level floor 15.

The inner rail 28 and the outer rail 29 extend in parallel in the front-rear direction of the vehicle body and spaced a predetermined interval from each other in a width direction of the vehicle.

The movable base 31 is slidably supported by the inner rail 28 and the outer rail 29.

The inner rail 28 and the outer rail 29 are members disposed in a generally symmetrical relationship with each other on the right and left sides.

The movable base 31 includes a movable section 32 slidably supported by the inner rail 28 and the outer rail 29, a seatback supporting section 33 provided on the movable section 32, and a link supporting section 34 provided on the movable section 32.

The movable section 32 has a base body 36, which is generally rectangular shaped when viewed in plan. An inner slider 37 and an outer slider 38 are provided on a back surface 36a (FIG. 2) of the base body 36. The inner slider is slidably supported by the inner rail 28, and the outer slider is slidably supported by the outer rail 29. That is, the movable section 32 is supported such that the movable section 32 is slidable along the inner rail 28 and the outer rail 29 in the front-rear direction of the vehicle body.

The seatback supporting section 33 is provided on a top surface 36b of the base body 36 (a top surface of the slide rail) and located roughly at a center 36c in the front-rear direction of the vehicle body. The seatback supporting section 33 is defined by an inside back supporting part 41 and an outside back supporting part 42 which are provided in alignment in the width direction of the vehicle.

The inside back supporting part 41 and the outside back supporting part 42 (i.e., the seatback supporting section 33) support a seatback 61 of the vehicular seat device 20 through a back support shaft 44 (FIG. 2) to allow the seatback 61 to pivot in the front-rear direction of the vehicle body.

The link supporting section 34 is provided on a front portion 36*d* of the base body 36. The link supporting section 34 includes a slanting support portion 46 having a base 47 provided on the front portion 3M of the base body 36, and a locking portion 51 provided at a support part 49 of the slanting support portion 46.

The base 47 of the slanting support portion 46 is provided on the back surface 36*a* (FIG. 2) of the front portion 36*d* of the base body 36 and located centrally in the width direction of the vehicle. The slanting support portion 46 also has an extension part 48 (see FIG. 6, too) extending obliquely downwardly from a front end of the base 47 along the sloping floor 14 in a forward direction of the vehicle body. The support part 49 of the slanting support portion 46 is provided at a distal end of the extension part 48 and obliquely upwardly extends in the forward direction of the vehicle body.

The extension part 48 is disposed on a front side of the sloping floor 14. The support part 49 is disposed a height dimension H2 (FIG. 6) above the low level floor 12. That is, the support part 49 (link supporting section 34) is disposed without contacting the low level floor 12.

Since the link supporting section 34 is not in contact with the low level floor 12, the movable base 31 can smoothly slide along the stationary rail 27 in the front-rear direction of the vehicle body.

Figure 6:
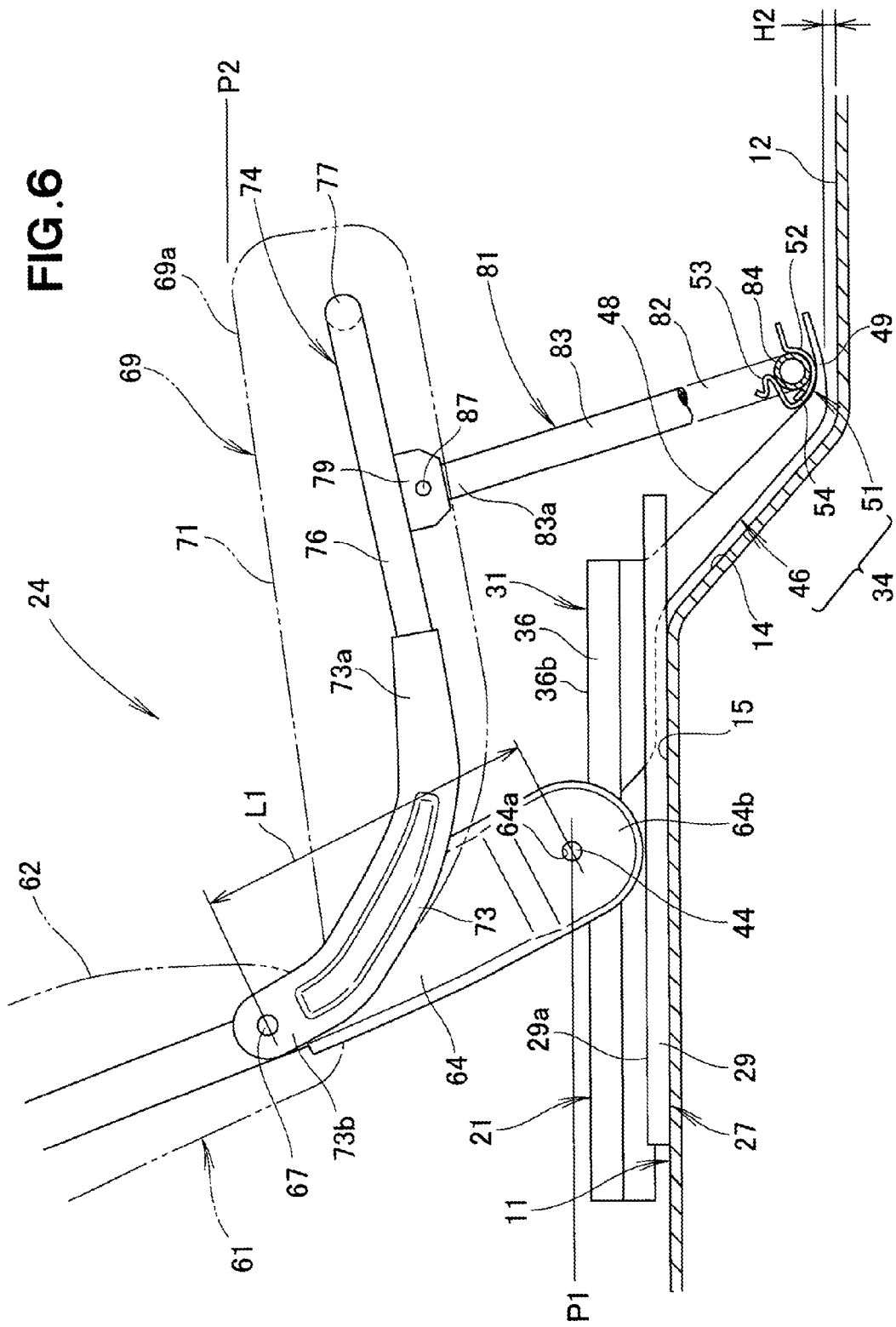
FIG. 6 is a cross-sectional view of the right slide rail and right seat of FIG. 2.

The locking portion 51 is secured to a surface of the support part 49 by a fastener 54 such as a bolt and a rivet (see FIG. 6, too). The locking portion 51 is formed by a resiliently deformable, flat spring. The locking portion 51 has a mating part 52 for receiving a connection link 81 (more specifically, a leg connecting portion 84) of the vehicular seat device 20, and an opening part 53 communicating with the mating part 52.

The opening part 53 faces upwardly and is formed above the mating part 52. The opening part 53 has its size slightly smaller than an outer diameter D1 of the leg connecting portion 84.

To fit in the mating part 52 of the locking portion 51, the leg connecting portion 84 forces the opening part 53 wide open. More specifically, the leg connecting portion 84 can easily fit in the mating part 52 from the opening part 52 forced wide open.

For detachment from the mating part 52 of the locking portion 51, the leg connecting portion 84 forces the opening part 53 wide open. More specifically, the leg connecting portion 84 can be easily detached from the mating part 52 through the opening part 52 forced wide open.

The right seat 24 is supported by the movable base 31.

The right seat 24 includes the seatback 61 provided through the back support shaft 44 to the seatback supporting section 33 such that the seatback 61 can pivot in the front-rear direction of the vehicle body. The right seat 24 also includes a seat cushion 69 pivotably supported by the seatback 61 through inner and outer seat cushion support shafts 67 (the inner one not shown). The right seat 24 further includes the connection link 81 supporting the seat cushion 69 on the locking portion 51 such that the seat cushion 69 can pivot in the front-rear direction of the vehicle body.

The seatback 61 includes a seatback body 62 for a passenger's back to rest on. The seatback 61 also includes an inner back bracket 63 protruding downwardly from a bottom of an inside of the seatback body 62, and an outer back bracket 64 protruding downwardly from a bottom of an outside of the seatback body 62.

The inner back bracket 63 has an inner support hole 63*a* formed through a lower portion thereof. The outer back bracket 64 has an outer support hole 64*a* formed through a lower portion thereof. The back support shaft 44 extends through the inner support hole 63*a* and the outer support hole 64*a* such that the inner back bracket 63 and the outer back bracket 64 are supported by the seatback supporting section 33 through the back support shaft 44 to pivot in the front-rear direction of the vehicle body.

The inner back bracket 63 is disposed between the inside back supporting part 41 and the outside back supporting part 42. The outer back bracket 64 is disposed on an outer end 42*a* of the outside back supporting part 42.

The outer back bracket 64 and the inner back bracket 63 are pivotably supported by the seatback supporting section 33 through the back support shaft 44. That is, the seatback 61 is provided to the seatback supporting section 33 (i.e., the movable base 31) through the back support shaft 44 such that the seatback 61 can pivot in the front-rear direction of the vehicle body.

The seatback 61 can be reclined about the back support shaft 44 in the front-rear direction of the vehicle body (i.e., a direction of an arrow A (FIG. 2)). The seatback 61 can also pivot about the back support shaft 44 in the forward direction of the vehicle body until the seatback 61 overlies the seat cushion 69.

Figure 5:
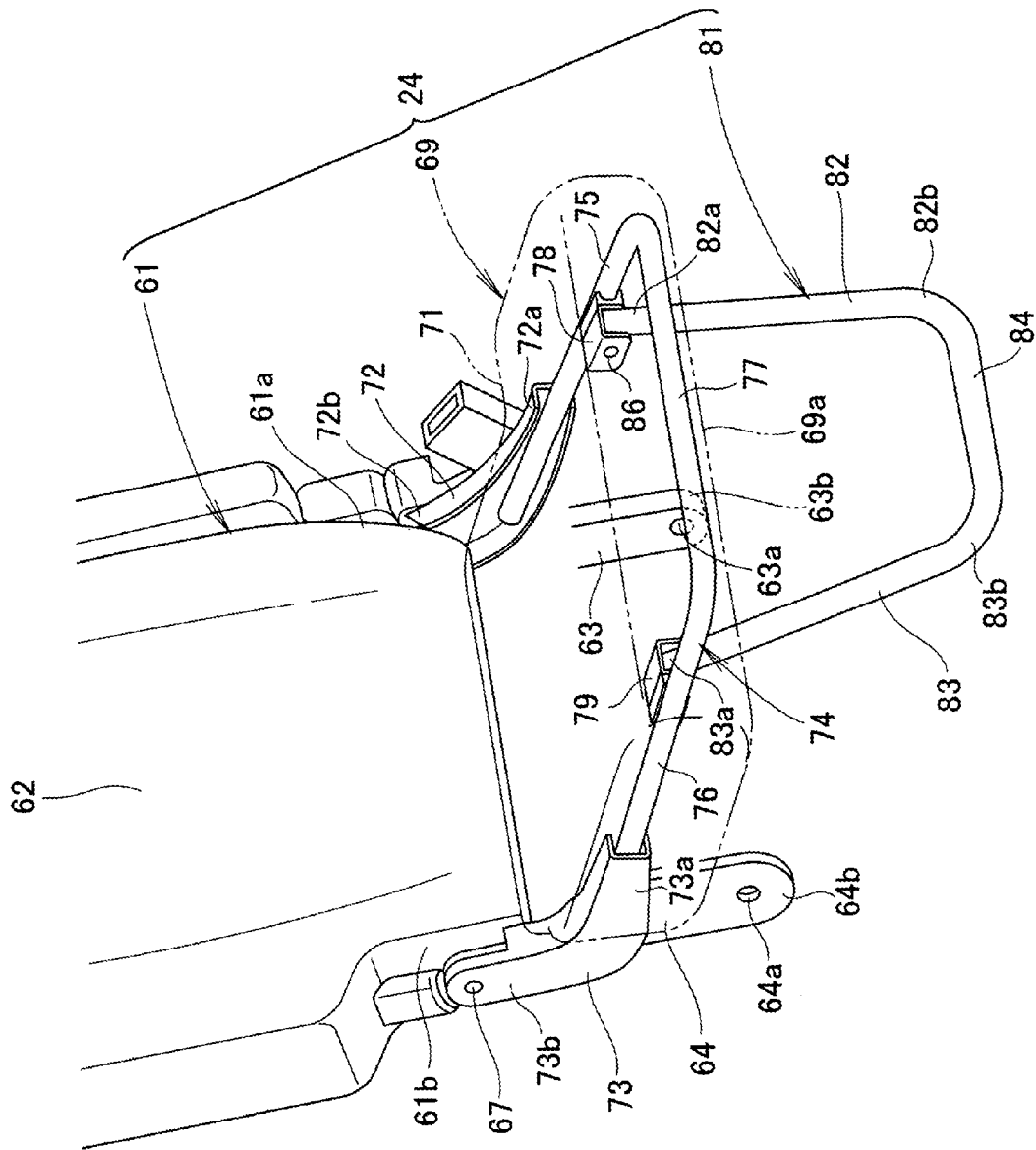
FIG. 5 is a perspective view of a right seat of FIG. 3.

As shown in FIGS. 5 and 6, the inner back bracket 63 has its lower end 63*b* disposed adjacent the top surface 36*b* of the base body 36. The outer back bracket 64 has its lower end 64*b* (lower end of the seatback) disposed lower than the top surface 36*b* of the base body 36.

Since the lower end 64*b* of the outer back bracket 64 is lower than the top surface 36*b* of the base body 36, the lower end 64*b* is disposed adjacent the high level floor 15.

As a result, the back support shaft 44 is disposed in a relatively low position P1 above the high level floor 15. This enables the right seat 24 to have a reduced height H3 (see FIG. 11) in the stowage mode in which the right seat 24 is folded.

The seat cushion 69 includes a cushion body 71 for the passenger to sit on. The seat cushion 69 also includes an inner cushion bracket 72 provided at a rear portion of an inside of the cushion body 71, and an outer cushion bracket 73 provided at a rear portion of an outside of the cushion body 71. The seat cushion 69 further includes a reinforcement pipe 74 supported by a front portion 72*a* of the inner cushion bracket 72 and a front portion 73*a* of the outer cushion bracket 73.

The inner cushion bracket 72 has a rear portion 72*b* (rear portion of the seat cushion). The rear portion 72*b* is supported by an inner lower portion 61*a* of the seatback 61 through the inner cushion support shaft (not shown) such that the rear portion 72*b* can pivot in the front-rear direction of the vehicle body. Similarly, the outer cushion bracket. 73 has a rear portion 73*b* (rear portion of the seat cushion). The rear portion 73*b* is supported by an outer lower portion 61*b* of the seatback 61 through the outer cushion support shaft 67 such that the rear portion 73*b* can pivot in the front-rear direction of the vehicle body.

That is, the seat cushion 69 is provided on the seatback 61 such that the seat cushion 69 can pivot about the rear portions 72*b*, 73*b* of the inner and outer cushion brackets 72, 73 (more specifically, about the inner and outer cushion support shafts 67) in the front-rear direction of the vehicle body.

The inner and outer cushion support shafts 67 are located a distance L1 above the inner and outer support holes 63a, 64a.

As a result, for example, by pivoting about the back support shaft 44 in the forward direction of the vehicle body with the right seat 24 in a seating mode (shown in FIG. 6), the seatback 61 pushes the seat cushion 69 in the forward direction of the vehicle body.

The reinforcement pipe 74 of the seat cushion 69 is defined by an inner pipe 75, an outer pipe 76, and a front connection pipe 77 which form a generally U-shaped configuration of the pipe 74, when viewed in plan. An inner link bracket 78 is provided on a front portion of the inner pipe 75. An outer link bracket 79 is provided on a front portion of the outer pipe 76.

The connection link 81 is connected to the inner link bracket 78 and the outer link bracket 79. As a result, the connection link 81 is connected to a front portion 69a of the seat cushion 69.

The connection link 81 has an inner leg portion 82. The inner leg portion 82 has an upper end part 82a supported by the inner link bracket 78 through a support pin 86 such that the upper end part 82a can pivot in the front-rear direction of the vehicle body. The connection link 81 also has an outer leg portion 83. The outer leg portion 83 has an upper end part 83a supported by the outer link bracket 79 through a support pin 87 such that the upper end part 83a can pivot in the front-rear direction of the vehicle body. The connection link 81 further has the leg connecting portion (lower end portion) 84 interconnecting a lower end part 82b of the inner leg portion 82 and a lower end part 83b of the outer leg portion 83.

That is, the connection link 81 is supported by the inner link bracket 78 and the outer link bracket. 79 through the respective support pins 86, 87 such that the connection link 81 can pivot in the front-rear direction of the vehicle body.

The inner link bracket 78 is provided on the front portion of the inner pipe 75. The outer link bracket 79 is provided on the front portion of the outer pipe 76. The front portion of the inner pipe 75 and the front portion of the outer pipe 76 are provided in the front portion 69a of the seat cushion 69.

That is, the connection link 81 is supported by the front portion 69a of the seat cushion 69 such that the connection link 81 can pivot in the front-rear direction of the vehicle body.

The leg connecting portion 84 is adapted to fit in the mating part 52 of the locking portion 51, such that the leg connecting portion 84 can pivot in the front-rear direction of the vehicle body.

To fit in the mating part 52 of the locking portion 51, the leg connecting portion 84 forces the opening part 53 wide open. That is, the leg connecting portion 84 can easily fit in the mating part 52 from the opening part 53 forced wide open.

The leg connecting portion 84 fits in the mating part 52, and thus is supported by the mating part 52 such that the leg connecting portion 84 can pivot in the front-rear direction of the vehicle body.

For detachment from the mating part 52 of the locking portion 51, the leg connecting portion 84 forces the opening part 53 wide open. That is, the leg connecting portion 84 can be easily detached from the opening part 53 forced wide open.

That is, the leg connecting portion 84 (connection link 81) detachable from the locking portion 51 is supported by the locking portion 51 such that the leg connecting portion 84 can pivot in the front-rear direction of the vehicle body.

When the seat cushion 69 is disposed in a seating position P2, the leg connecting portion 84 of the connection link 81 fits in with (is supported by) the mating part 52 of the locking portion 51. That is, the front portion 69a of the seat cushion 69 is supported by the connection link 81 to hold the seat cushion 69 in the seating position P2.

The leg connecting portion 84 is detachably supported by the locking portion 51. Upon detachment of the leg connecting portion 84 from the locking portion 51, the seat cushion 69 can tip up by pivoting back onto the seatback 61 (FIG. 8 (b).

The connection link 81 is supported such that the connection link 81 can pivot about the leg connecting portion 84 in the front-rear direction of the vehicle body with the leg connecting portion 84 of the connection link 81 mating with the mating part 52 of the locking portion 51.

Further, the connection link 81 is supported by the front portion 69a of the seat cushion 69 such that the connection link 81 can pivot in the front-rear direction of the vehicle body.

In other words, the front portion 69a of the seat cushion 69 is supported by the connection link 81 such that the front portion 69a is movable in the front-rear direction of the vehicle body with the leg connecting portion 84 mating with the mating part 52 of the locking portion 51.

As a result, the seat cushion 69 can be smoothly moved by the seatback 61 in the forward direction of the vehicle body to fold the right seat 24 into the stowage mode (FIG. 10(b)).

Next, a discussion is made with reference to FIG. 7 as to an example in which the right seat 24 in the seating mode slides in the front-rear direction of the vehicle body.

As shown in FIG. 7(a), the seat cushion 69 is disposed in the seating position P2 when the right seat 24 is disposed in the seating mode.

The seatback 61 is supported by the base body 36 through the seatback supporting section 33 (see FIG. 3) and the back support shaft 44 when the right seat 24 is disposed in the seating mode. The seat cushion 69 is supported by the seat back 61 through the inner and outer seat cushion support shafts 67 while the seat cushion 69 is supported by the locking portion 51 through the connection link 81.

That is, the right seat 24 (the seatback 61 and the seat cushion 69) is supported by the movable base 31.

As shown in FIG. 7(b), the right seat 24 in the seating mode can slide together with the movable base 31 along the stationary rail 27 in a front direction of the vehicle body (a direction of an arrow B).

Also, the right seat 24 in the seating mode can slide together with the movable base 31 along the stationary rail 27 in a rear direction of the vehicle body (a direction of an arrow C).

Figure 9:
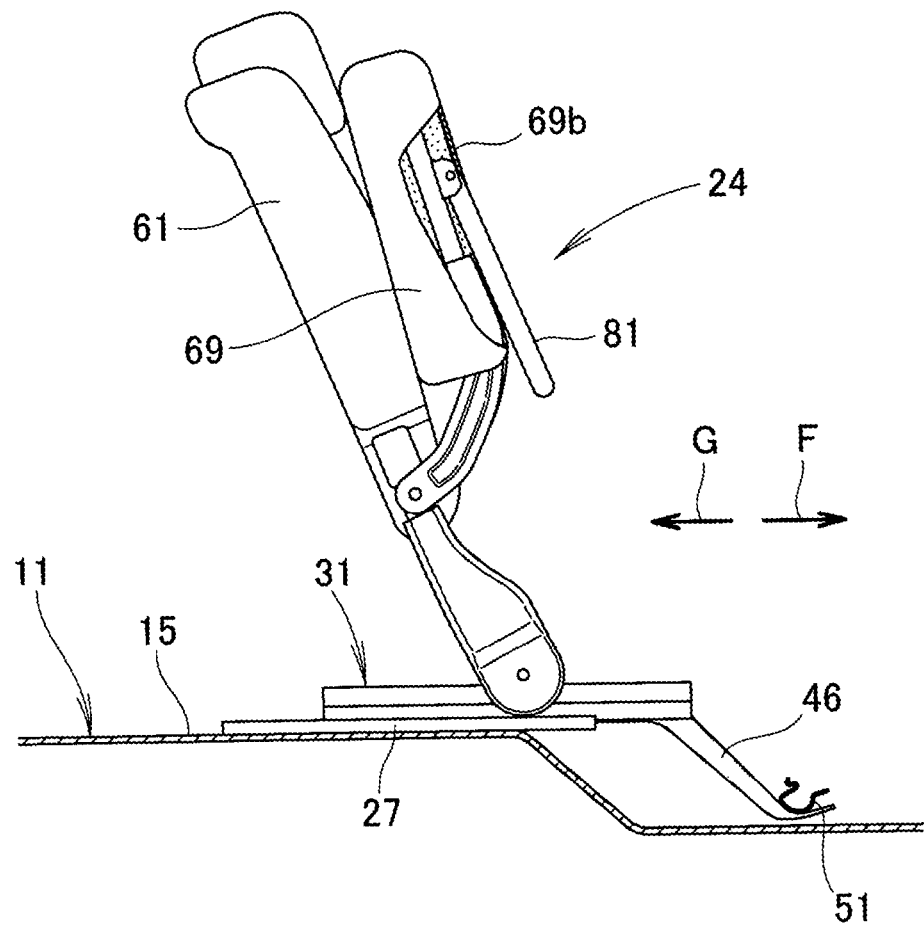
FIG. 9 is a view illustrating an example in which the right seat according to the present invention slides in the tip-up mode in the forward direction of the vehicle body.

Next, a discussion is made with reference to FIGS. 8 and 9 as to an example in which the right seat 24 in a tip-up mode slides in the front-rear direction of the vehicle body.

As shown in FIG. 8(a), the right seat 24 is, at first, disposed in the seating mode. Next, the seat cushion 69 upwardly pivots about the inner and outer cushion support shafts 67, as indicated by an arrow D. The upward pivoting of the seat cushion 69 detaches the leg connecting portion 84 of the connection link 81 from the locking portion 51.

As shown in FIG. 8(b), the detachment of the leg connecting portion 84 from the locking portion 51 enables the seat cushion 69 to tip up by pivoting back onto the seatback 61, as indicated by an arrow E. As a result of the pivoting of the seat cushion 69 back onto the seatback 61, the right seat 24 is disposed in the tip-up mode.

Then, the connection link 81 is secured to a bottom portion 69b of the seat cushion 69 by locking members (not shown).

With the right seat 24 disposed in the tip-up mode, the seatback 61 is supported by the base body 36 through the seatback supporting section 33 (see FIG. 3) and the back support shaft 44. The seat cushion 69 is supported by the seatback 61 through the inner and outer cushion support shafts 67.

That is, the seatback 61 and the seat cushion 69 are supported by the movable base 31.

As shown in FIG. 9, the right seat 24 in the tip-up mode can slide together with the movable base 31 along the stationary rail 27 in the front direction of the vehicle body (a direction of an arrow F). Also, the right seat 24 in the tip-up mode can slide together with the movable base 31 along the stationary rail 27 in the rear direction of the vehicle body (a direction of an arrow G).

Figure 11:
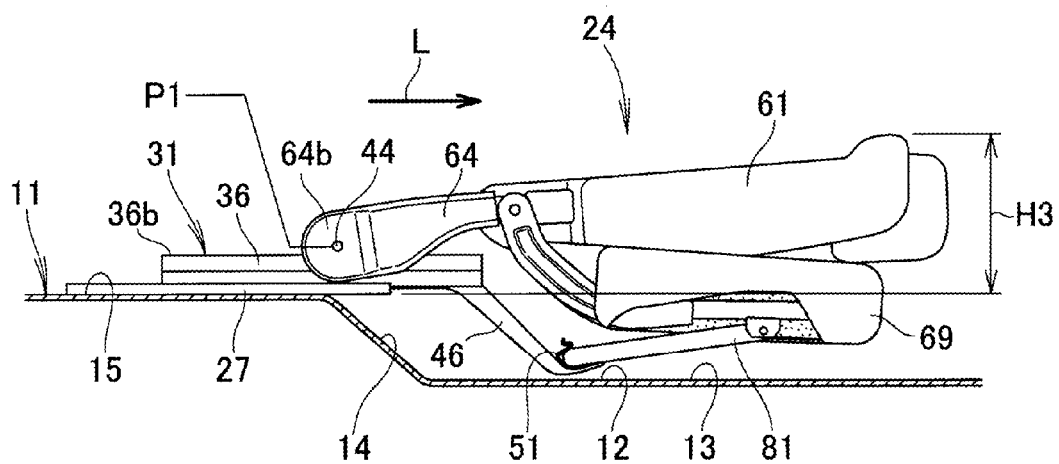
FIG. 11 is a view illustrating an example in which the right seat according to the present invention slides in the stowage mode in the forward direction of the vehicle body.

Next, a discussion is made with reference to FIGS. 10 and 11 as to an example in which the right seat 24 in the stowage mode slides in the front-rear direction of the vehicle body.

As shown in FIG. 10(a), the right seat 24 is, at first, disposed in the seating mode. Then, the seatback 61 pivots about the back support shaft 44 in the forward direction of the vehicle body, as indicated by an arrow H, such that the seatback 61 assumes the lying position.

Upon the pivoting of the seatback 61 in the forward direction to the lying position, the seatback 61 (more specifically, the inner and outer cushion support shafts 67) pushes the seat cushion 69 in the forward direction of the vehicle body, as indicated by an arrow I.

The front portion 69a of the seat cushion 69 is supported by the connection link 81 such that the front portion 69a can move in the front-rear direction of the vehicle body, with the leg connecting portion 84 of the connection link 81 mating with the mating part 52 of the locking portion 51.

Thus, the connection link 81 pivots in the forward direction of the vehicle body, as indicated by an arrow J, about the leg connecting portion 84 mating with the mating part 52 of the locking portion 51. The pivotal movement of the connection link 81 in the forward direction of the vehicle body causes the seat cushion 69 to smoothly move in a forward and downward direction of the vehicle body, as indicated by an arrow K.

As shown in FIG. 10(b), the seatback 61 overlies the seat cushion 69 after the seat cushion 69 is moved in the forward and downward direction as a result of the forward pivotal movement of the seatback 61.

The connection link 81 underlies the bottom portion 69b of the seat cushion 69 as the seatback 61 overlies the seat cushion 69.

By the seatback 61 overlying the seat cushion 69 in the manner stated above, the right seat 24 is folded into the stowage mode (dive-down mode).

When the right seat 24 is disposed in the stowage mode and when the right seat 24 is disposed in the seating mode, the seatback 61 is supported by the base body 36 through the seatback supporting section 33 (see FIG. 3) and the back support shaft 44. In addition, the seat cushion 69 is supported by the seatback 61 through the inner and outer cushion support shafts 67 while the seat cushion 69 is supported by the locking portion 51 through the connection link 81.

That is, the right seat 24 (the seatback 61 and the seat cushion 69) is supported by the movable base 31.

As shown in FIG. 11, the right seat 24 in the stowage mode slides together with the movable base 31 along the stationary rail 27 in the front direction of the vehicle body, as indicated by an arrow L, such that the right seat 24 reaches the stowing location 13 of the low level floor.

Since the right seat 24 folded in the stowage mode slides to the stowing location 13, the right seat 24 has its improved convenience. The right seat 24 can slide from the stowing location 13 along the stationary rail 27 in the rear direction of the vehicle body for the intended purpose.

As shown in FIG. 10(a), the lower end 64b of the outer back bracket 64 is disposed lower than the top surface 36b of the base body 36. As a result of the lower end 64b disposed in this manner, the back support shaft 44 is disposed in the relatively low position P1 above the high level floor 15.

As shown in FIG. 11, thus, the right seat 24 folded in the stowage mode can slide to the stowing location 13 where the right seat 24 in the stowage mode has its reduced height H3. This further improves the convenience of the right seat 24 folded in the stowage mode.

The vehicular seat device according to the present invention is not limited to that discussed in Embodiment, but may be changed or modified where appropriate.

Although, in Embodiment, the vehicular seat device has been described as a seat in the rearmost row provided in the rear part of the vehicle body floor 11, for example, the vehicular seat device may be another seat such as a driver's seat or a passenger seat provided in the front part of the vehicle body floor 11.

The vehicle, the vehicle body floor, the low level floor, the high level floor, the vehicular seat device, the left and right slide rails, the left and right seats, the stationary rail, the inner and outer rails, the movable base, the seatback, the inner and outer back brackets, the lower ends of the inner and outer back brackets, the seat cushion, the front portion of the seat cushion, the rear portions of the inner and outer cushion brackets, the connection link, and the leg connecting portion, all of which have been described in Embodiment, have their shapes and forms which are not limited to those disclosed herein but may be changed or modified where appropriate.

INDUSTRIAL APPLICABILITY

The present invention is preferably applied to an automobile including a vehicular seat device having a seat provided on a vehicle body floor through a slide rail such that the seat is movable in the front-rear direction of the vehicle body.

REFERENCE SIGNS LIST

10 . . . a vehicle, 11 . . . a vehicle body floor, 12 . . . a low level floor, 13 . . . a stowing location of the low level floor, 15 . . . a high level floor, 20 . . . a vehicular seat device, 21, 22 . . . left and right slide rails, 24, 25 . . . left and right seats, 27 . . . a stationary rail, 28, 29 . . . inner and outer rails, 36b . . . a top surface of a base body, 31 . . . a movable base, 61 . . . a seatback, 63, 64 . . . inner and outer back brackets, 64b . . . a lower end of the outer back bracket (a lower end of the seatback), 69 . . . a seat cushion, 69a . . . a front portion of the seat cushion, 72b, 73b . . . rear portions of inner and outer cushion brackets (a rear portion of the seat cushion), 81 . . . a connection link, 84 . . . a leg connecting portion (a lower end of the connection link)

The invention claimed is:

1. A vehicular seat device comprising a seat, an inner rail, an outer rail, and a movable base,
   the outer rail being provided outside of the inner rail in a width direction of the vehicle body,
   the inner rail and the outer rail being secured to a high level floor of a vehicle body floor and extending in a front-rear direction of the vehicle body,
   the high level floor being provided rearward of a low level floor in the front-rear direction of the vehicle body, and the high level floor being connected to the low level floor of the vehicle body floor,
   the movable base being provided on the inner rail and the outer rail so as to be movable with respect to the high level floor,
   the seat being provided on the movable base, and
   the seat being supported by the vehicle body floor such that the seat is movable in the front-rear direction of the vehicle body,
   wherein the seat comprises:
   a seatback provided on the movable base such that the seatback is pivotable in the front-rear direction of the vehicle body;
   a seat cushion having a rear portion supported by the seatback such that the seat cushion is pivotable about the rear portion of the seat cushion in an upward and downward direction of the vehicle body relative to the seatback; and
   a connection link having a lower end portion which is positioned between the inner rail and the outer rail in the width direction of the vehicle body, and the connection link lower end portion being detachably supported by the movable base, the seat cushion having a front portion supported by the movable base through the connection link such that the front portion of the seat cushion is movable in the front-rear direction of the vehicle body,
   wherein the seatback is forwardly pivotable to overlie the seat cushion,
   wherein the movable base includes a link supporting section provided therewith, the link supporting section being positioned between the inner rail and the outer rail in the width direction of the vehicle body, and the link supporting section being provided to detachably support the lower end portion of the connection link, and
   wherein the seat is movable to a stowing location on the low level floor with the seatback overlying the seat cushion.

2. The device of claim 1, wherein the seatback has a lower end disposed lower than top surfaces of the inner rail and the outer rail in the upward and downward direction of the vehicle body.

3. The device of claim 1, wherein the link supporting section is provided as part of the movable base so as to be integrally movable with the movable base on the inner rail and the outer rail, and to directly detachably support the lower end portion of the connection link, and
   wherein the link supporting section extends from a front portion of the movable base to a space which is positioned in an upper side of the low level floor and lower than the high level floor.

* * * * *